United States Patent

Ogawa et al.

Patent Number: 5,385,499
Date of Patent: Jan. 31, 1995

[54] ENVELOPE FOR DISPLAY DEVICE AND METHOD FOR MANUFACTURING SAME

[75] Inventors: Yukio Ogawa; Tatsuo Yamaura, both of Mobara, Japan

[73] Assignee: Futaba Denshi Kogyo K.K., Mobara, Japan

[21] Appl. No.: 10,782

[22] Filed: Jan. 29, 1993

[30] Foreign Application Priority Data

Jan. 30, 1992 [JP] Japan .................. 4-014755

[51] Int. Cl.⁶ .................................. H01J 9/26
[52] U.S. Cl. .......................... 445/24; 445/25
[58] Field of Search ............. 445/24, 25; 427/376.2

[56] References Cited

U.S. PATENT DOCUMENTS 4,428,764  1/1984  Snitzer et al. ................... 445/25

FOREIGN PATENT DOCUMENTS 2735468  11/1978  Germany ...................... 445/25
61-224256  10/1986  Japan ........................... 445/25

OTHER PUBLICATIONS

Beckerman et al., "Gas Panel Sealant," *IBM Tech. Discl. Bull.*, vol. 15, No. 8; Jan., 1973; pp. 2518–2519.

*Primary Examiner*—P. Austin Bradley
*Assistant Examiner*—Jeffrey T. Knapp
*Attorney, Agent, or Firm*—Oblon, Spivak, McClelland, Maier & Neustadt

[57] ABSTRACT

A method of making an envelope for a display device is capable of permitting positioning and fixing of glass beads acting as spacers to be carried out with high precision and increased strength, respectively. Liquid for forming photoadhesive photosensitive film is applied to a substrate. The substrate is exposed to light through a mask to cause portions of the film on which glass beads are to be fixed to exhibit adhesion. Glass beads coated with glass frit of a low softening point are applied to the substrate and unnecessary glass beads other than those applied to the above-described portions of the film are removed. Subsequently, a casing is arranged on the substrate and calcination is carried out. This results in the photosensitive film volatilizing and the glass beads being adhered to both a flat plate and the substrate.

15 Claims, 5 Drawing Sheets

ENVELOPE FOR DISPLAY DEVICE AND METHOD FOR MANUFACTURING SAME

BACKGROUND OF THE INVENTION

This invention relates to an envelope for a display device such as a liquid crystal display device, a plasma display device, a fluorescent display device or the like and a method manufacturing the same, and more particularly to an improvement in formation of spacers serving to keep an interval between an anode substrate and a flat plate constant in an envelope for a display device.

A display device such as a liquid crystal display device, a plasma display device, a fluorescent display device or the like generally includes an envelope formed of an anode substrate and a flat plate arranged opposite to each other. For this purpose, there has been conventionally known in the art a structure wherein glass beads are interposedly arranged between the anode substrate and the flat plate so as to act as spacers or studs therebetween, to thereby keep an interval therebetween constant. Such studs are formed in the envelope in such a manner as shown in FIGS. 5A to 5F.

More particularly, a substrate 1 made of glass is washed and then coated on an inner surface thereof with a transparent conductive film such as an ITO film or a thin aluminum film to form wirings and anode conductors thereon. Then, liquid for forming a photoadhesive photosensitive film 2 or a photosensitive film which exhibits adhesion when it is exposed to light such as ultraviolet rays is applied to the whole inner surface of the substrate 1 by spin coating or the like. For this purpose, a p-diazonium-N,N'-dimethyl aniline-zinc chloride double salt such as a material commercially available under a trademark "PDMA" from Tokyo Kasei Kogyo Kabushiki Kaisha may be used as liquid for the photosensitive film 2.

Then, a mask 3 which is formed so as to permit portions of the substrate 1 on which studs are to be formed to be exposed to ultraviolet rays therethrough is positioned above the substrate 1 and then ultraviolet rays are irradiated to the photosensitive film 2 through the mask 3. This permits the portions of the film 2 exposed to the rays to exhibit adhesion. Then, the exposed portions of the photosensitive film 2 each are coated with an oxide solder 4 mainly consisting of low-melting glass.

Thereafter, glass beads 5 each are placed on the oxide solder 4. Then, the substrate 1 on which the glass beads 5 are placed is heated to a temperature of 400° to 600° C., resulting in being calcined. The heating also causes decomposition and volatilization of the photosensitive film 2 and softening of the oxide solder 4, to thereby bond the glass beads 5 onto the substrate 5 by fusion. Finally, a casing 6 is sealed onto the substrate 1 through the glass beads 5, resulting in an envelope being formed.

However, it was found that formation of the studs by the conventional process described above exhibits some important disadvantages.

In the conventional method, it is required to deposit the oxide solder 4 on the adherent photosensitive film 2 provided on each of the positions on the substrate on which the studs are to be formed. Unfortunately, this causes adhesion properties of the photosensitive film 2 to be deteriorated to a degree sufficient to fail in satisfactory fixing of the glass beads 5 onto the substrate 1 through the film 2, leading to a failure patterning.

More particularly, although an increase in amount of the oxide solder 4 used permits the fixing of the glass beads 5 onto the substrate 1 through the solder 4, it causes temporary holding of the glass beads 4 on the substrate 1 through the adhesive photosensitive film 2 to be deteriorated, leading to displacement of the studs. On the contrary, a decrease in amount of the oxide solder 4 used ensures that the photoadhesive photosensitive film 2 exhibits adhesion sufficient to satisfactorily carry out temporary holding of the glass beads 5 onto the substrate 1, however, fixing of the glass beads 5 onto the substrate 1 is insufficient.

Also, the conventional process is so constructed that the oxide solder 4 is arranged only between the glass bead 5 and the substrate 1. Such arrangement of the oxide solder 4, when the casing 6 is sealed to the substrate 1, fails to adhere each of the glass beads 5 to a front cover or plate of the casing 6, resulting in failing to arrange the glass bead or stud 5 in the envelope with increased strength.

SUMMARY OF THE INVENTION

The present invention has been made in view of the foregoing disadvantage of the prior art.

Accordingly, it is an object of the present invention to provide an envelope for a display device which is capable of permitting spacers to be positioned with high precision and fixed with increased strength.

It is another object of the present invention to provide a method for manufacturing an envelope for a display device which is capable of providing the envelope while positioning spacers with high precision and fixing them with increased strength.

It is a further object of the present invention to provide a method for forming spacers for an envelope which is capable of positioning the spacers with high precision and fixing them with increased strength.

In accordance with one aspect of the present invention, an envelope for a display device is provided. The envelope includes a substrate made of glass, a flat plate made of glass and arranged opposite to the substrate, and spacers arranged between the substrate and the flat plate. The spacers each are coated on a surface thereof with an oxide solder and adhered to the substrate and flat plate through the oxide solder, to thereby keep an interval between the substrate and the flat plate constant.

In a preferred embodiment of the present invention, the spacers comprise glass beads.

In accordance with another aspect of the present invention, a method for manufacturing an envelope for a display device is provided. The method comprises the steps of preparing spacers each coated with an oxide solder, temporarily fixing the coated spacers onto positions predetermined on a glass substrate, putting a glass flat plate on the spacers, and heating the spacers to a temperature of 400° to 500° C. for calcination to integrate the glass substrate, spacers and glass flat plate with each other.

Also, in accordance with a further aspect of the present invention, a method for forming spacers for an envelope is provided. The method comprises the steps of uniformly applying liquid for forming a photoadhesive photosensitive film to a glass substrate, exposing said glass substrate to light in a predetermined pattern, placing spacers each having an oxide solder coated thereon on the substrate, removing unnecessary spacers of the spacers from the substrate, and carrying out calcination while superposing a flat plate on the substrate through the remaining spacers to adhere the spacers to the substrate and flat plate by fusion.

In accordance with this aspect of the present inventions, a method for forming spacers for an envelope is also provided. The method comprises the steps of applying a mixture of liquid for forming a photopolymerizable photosensitive film and spacers each coated thereon with an oxide solder to a substrate, exposing the substrate to light in a predetermined pattern and washing out an unexposed portion of the substrate with developing liquid, and carrying out calcination while superposing a flat plate on the substrate through the remaining spacers to adhere the spacers to the substrate and flat plate by fusion.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described hereinafter with reference to FIGS. 1A to 4B.

Figure 5A:
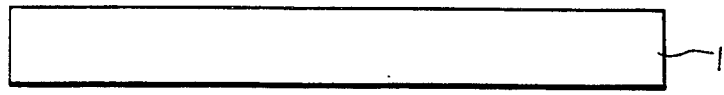
FIGS. 5A to 5F each are a schematic view showing steps in a conventional stud forming process using glass beads.
Figure 5B:
Figure 5C:
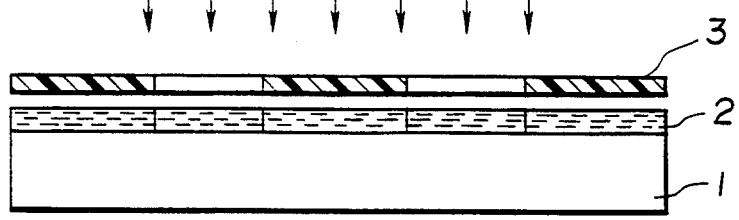
Figure 5D:
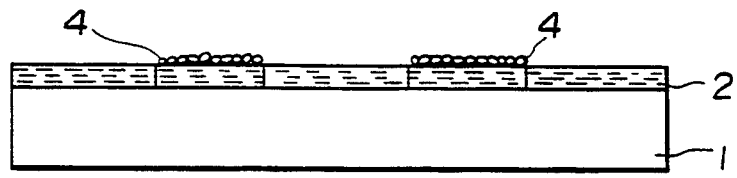
Figure 5E:
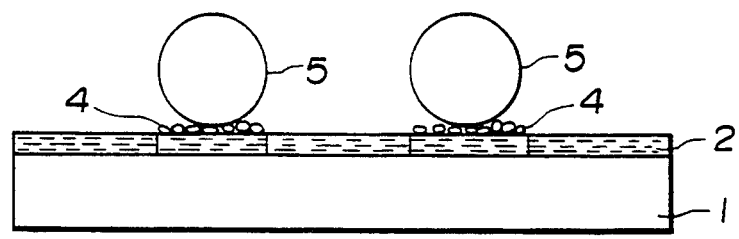
Figure 5F:
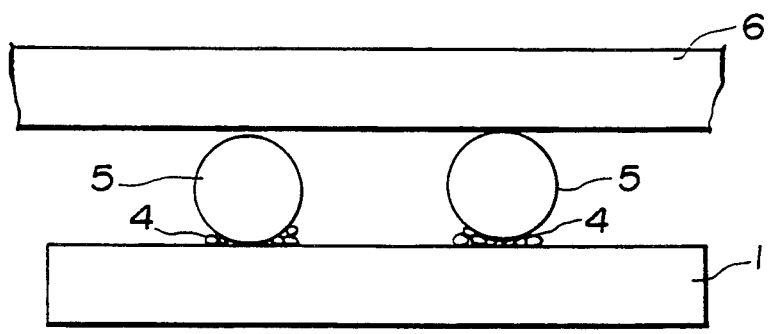

Referring first to FIGS. 1A to 1E, an embodiment of a method for manufacturing an envelope for a display device according to the present invention is illustrated. Steps shown in FIGS. 1A to 1C may be practiced in the same manner as the steps of the conventional method described above with reference to FIGS. 5A to 5C.

Figure 1A:
FIGS. 1A to 1E each are a schematic view showing each of steps in an embodiment of a method for manufacturing an envelope for a display device according to the present invention.
Figure 1B:
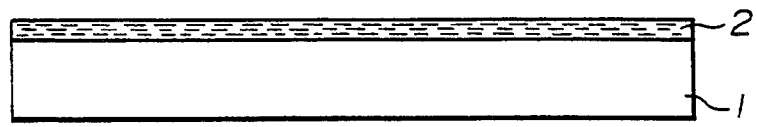
Figure 1C:
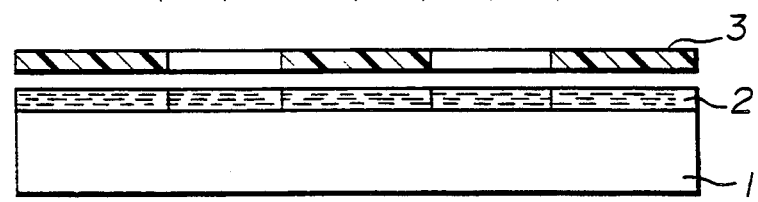
Figure 1D:
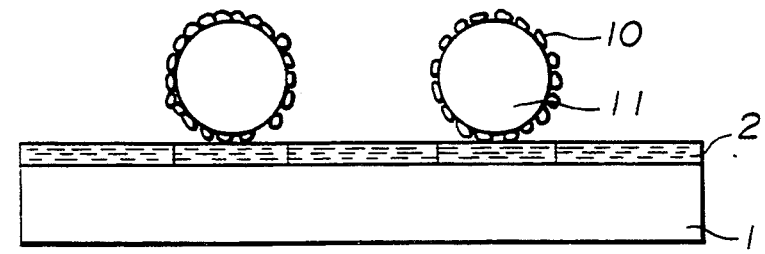

In the illustrated embodiment, as shown in FIG. 1D, composite type glass beads 11 each having glass frit 10 of a low softening point coated or deposited thereon so as to act as an oxide solder are constitute spacers. First, preparation of the composite type glass beads 11 will be described.

The glass beads 11 may be prepared using a hybridization system which is an apparatus for modifying a powder surface. The system generally includes an OM dizer for applying secondary particles to a surface of primary particles and a hybridizer for subjecting the particles to a mechanical or thermal treatment to fix the secondary particles to the surface of the primary particles or form a film of the secondary particles on the surface of the primary particles.

Figure 3:
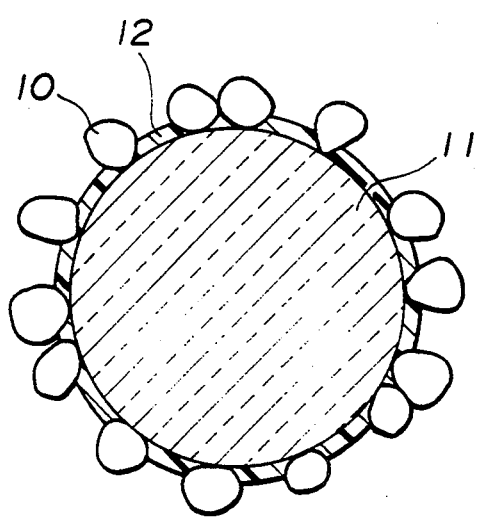
FIG. 3 is a sectional view showing a composite type glass bead constituting a spacer which is applicable to the embodiment shown in FIGS. 1A to 1E.

First, as shown in FIG. 3, fine particles 12 of PMMA (polymethyl methacrylate) are electrostatically applied to a surface of each of glass beads 11. Then, a heat treatment is carried out on the fine PMMA particles 12 using the hybridizer to form a film of the particles 12 on the glass beads 11. Subsequently, each of the glass beads 11 having the PMMA film 12 formed thereon and the glass frit 10 are subject to a simplified dispersion treatment using the OM dizer. Thereafter, the hybridizer is used for fixing the glass frit 11 onto the PMMA film 12 formed on the bead body 11, resulting in such glass beads 11 as shown in FIG. 3 being prepared.

Figure 4A:
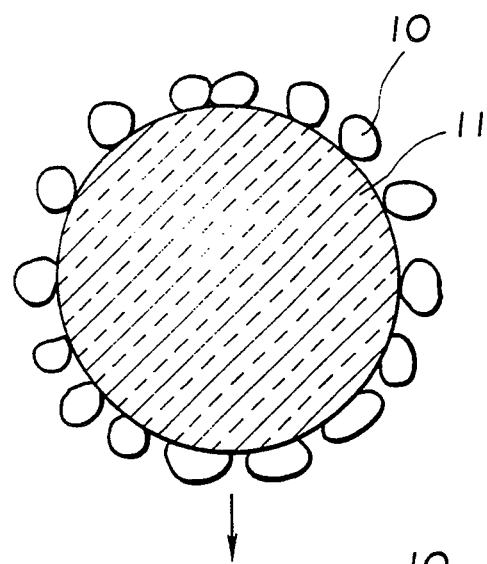
FIGS. 4A and 4B each are a sectional view showing a step in formation of the spacer or glass bead shown in FIG. 3.
Figure 4B:
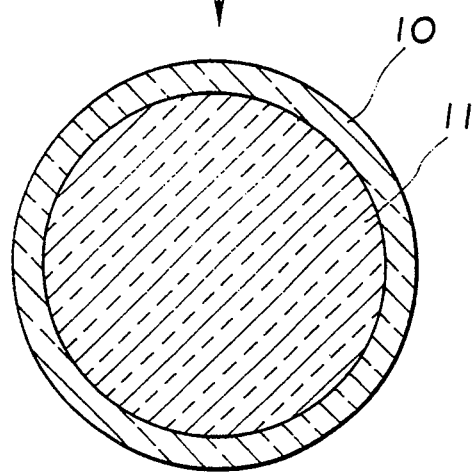

The composite type glass beads suitable for use in the illustrated embodiment may be prepared in such a manner as shown in FIGS. 4A and 4B.

More particularly, as shown in FIG. 4A, glass frit 10 of a low softening point is deposited on a glass bead 11 by a simplified dispersion treatment by means of the OM dizer. Then, as shown in FIG. 4B, the glass frit 10 is formed into a film on the glass bead 11 and fixed thereon by means of the hybridizer, resulting in a coated glass bead being prepared.

The glass beads prepared as shown in FIG. 3 or FIGS. 4A and 4B are applied to adhesion exhibiting portions of a photoadhesive photosensitive film 2 formed on a substrate 1 which are subject to light exposure through a mask 3. Then, unnecessary glass beads other than the glass beads thus adhesively applied to the substrate 1 are removed using any suitable means such as air jet or the like.

Figure 1E:
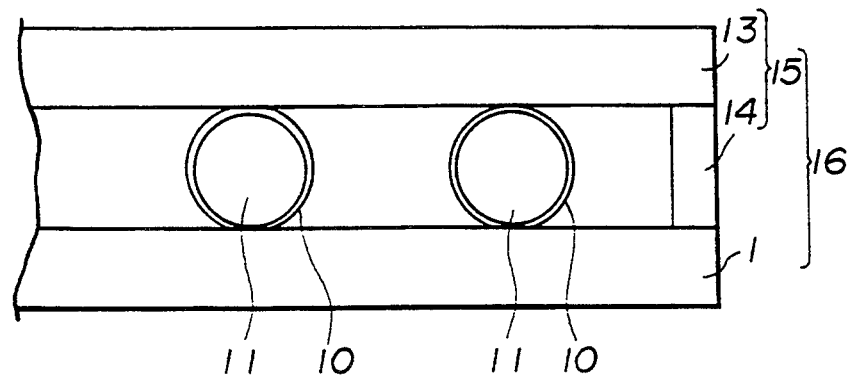

Then, as shown in FIG. 1E, a casing 15 which includes a flat plate 13 and side plates 15 is mounted on the substrate 1, so that a box-like envelope 16 may be assembled. The envelope 16 thus assembled is heated to a temperature of 400° to 600° C. for calcination. This results in the glass frit 10 of a low softening point dispersed on each of the glass beads 11 being melted, so that the glass beads may be adhesively fixed to both substrate 1 and flat plate 13 through the melted glass frit 10. The photosensitive film 2 is removed by volatilization during the heating for calcination.

Figure 2A:
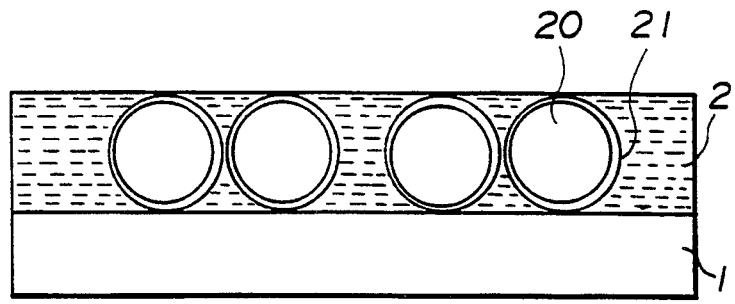
FIGS. 2A to 2C each are a schematic view showing each of steps in another embodiment of a method for manufacturing an envelope for a display device according to the present invention.
Figure 2B:
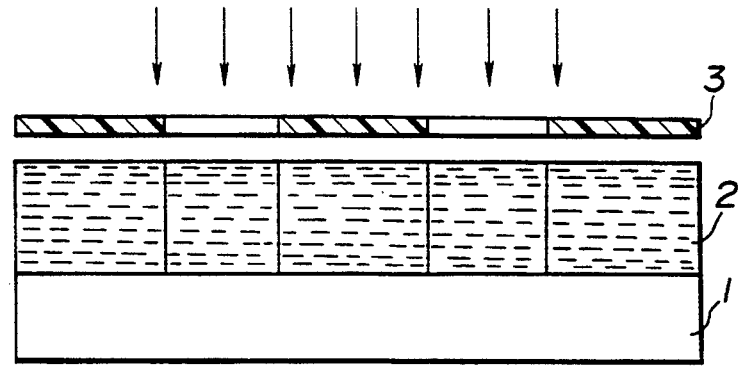
Figure 2C:
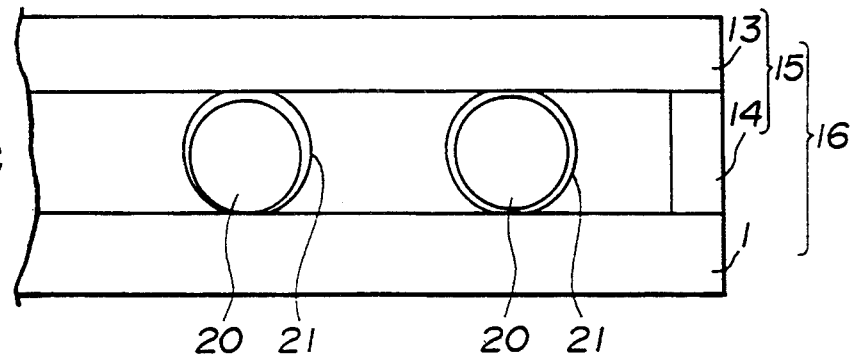

Referring now to FIGS. 2A to 2C, another embodiment of a method for manufacturing an envelope for a display device according to the present invention is illustrated. In the illustrated embodiment, as shown in FIG. 2A, liquid for forming a photosensitive film 2 is applied to a surface of a substrate 1. In the illustrated embodiment, the liquid is adapted to be photopolymerizable. For this purpose, for example, 1 to 5% aqueous ammonium dichromate solution prepared by mixing ammonium dichromate, PVA (polyvinyl alcohol) and water may be used as the liquid. Then, the liquid is mixed with glass beads 20 each coated thereon with glass frit 21 of a low softening point in the same manner as shown in FIGS. 4A and 4B, to thereby form a slurry, which is then deposited on a substrate 1. The deposition may be carried out by any suitable procedure such as spin coating, printing, doctor coating or the like. Thereafter, the substrate 1 is dried, resulting in the photosensitive film 2 being formed.

Then, as shown in FIG. 2B, portions of the substrate 1 on which spacers or glass beads 20 are to be arranged are exposed to ultraviolet rays through a mask 3, so that the photosensitive film on each of the portions of the substrate 1 may be polymerized. Then, the photosensitive film 2 is washed with developing liquid such as, for example, water, resulting in an unexposed part of the photosensitive film 2 being removed.

Thereafter, as shown in FIG. 2C, a casing 15 constituted by a flat plate 13 and side plates 14 is mounted on the substrate 1 to form a box-like envelope 16, which is then heated to a temperature of 400° to 600° C. for calcination. This causes the glass frit 21 to be softened, so that the glass beads 20 each may be adhered to both substrate 1 and flat plate 13. The photosensitive film 2 is decomposed and volatilized during the heating for calcination, to thereby be removed.

As can be seen from the foregoing, the present invention permits the glass beads to be positively adhered to the substrate through the adhesive film while being surrounded with the adhesive film. This results in adhesion of the glass beads to the substrate required during manufacturing of the envelope being significantly increased, to thereby effectively prevent a failure in patterning of the glass beads.

Also, in the present invention, the glass beads each are subject to calcination while being covered on a whole surface thereof with the oxide solder, to thereby be adhered to both substrate and flat plate. This permits glass beads acting as the spacers to exhibit increased adhesion strength, to thereby minimize a failure in pattering of the glass beads due to a failure in adhesion to the substrate and/or flat plate. Further, any possible variation in diameter of the glass beads may be effectively absorbed by deformation of the glass beads during heating for calcination of the oxide solder, to thereby ensure a space of a substantially uniform interval between the substrate and the flat plate.

While preferred embodiment of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for manufacturing an envelope for a display device, comprising the steps of:
    preparing spacers each coated with an oxide solder;
    uniformly applying liquid for forming a photoadhesive photosensitive film to a glass substrate;
    exposing said glass substrate to light in a pattern;
    placing said coated spacers on positions corresponding to said pattern;
    putting a glass flat plate on said spacers; and
    heating said spacers to integrate said glass substrate, spacers and glass flat plate with each other.

2. The method according to claim 1, wherein said spacers comprise glass beads.

3. The method according to claim 1, wherein the heating step comprises calcination to adhere the spacers to the substrate and flat plate by fusion.

4. The method according to claim 1, wherein said spacers are glass beads, and further comprising preparing said spacers by applying polymethyl methacrylate to a surface of each glass bead and then applying a glass frit including an oxide solder.

5. The method according to claim 1, comprising the steps of:
    preparing said spacers having an oxide solder coating thereon, wherein said spacers are glass beads;
    forming a photoadhesive photosensitive film on said glass substrate;
    exposing said glass substrate to light through a mask to expose an adhesive pattern in the photoadhesive photosensitive film;
    placing said coated glass bead spacers on said photoadhesive photosensitive film;
    placing a glass flat plate on said spacers; and
    heating said spacers to adhere the spacers to the substrate and flat plate by fusion.

6. The method according to claim 5, further comprising, after the step of exposing, a step of removing glass bead spacers other than spacers on said adhesive pattern.

7. A method for forming spacers for an envelope comprising the steps of:
    uniformly applying liquid for forming a photoadhesive photosensitive film to a glass substrate;
    exposing said glass substrate to light in a pattern;
    placing spacers each having an oxide solder coated thereon on said substrate;
    removing unnecessary spacers of said spacers from said substrate; and
    carrying out calcination while superposing a flat plate on said substrate through the remaining spacers to adhere said spacers to said substrate and flat plate by fusion.

8. The method according to claim 7, wherein said spacers comprise glass beads.

9. A method for forming spacers for an envelope comprising the steps of:
    applying a mixture of liquid for forming a photopolymerizable photosensitive film and spacers each coated thereon with an oxide solder to a substrate;
    exposing said substrate to light in a pattern and washing out an unexposed portion of said substrate with developing liquid; and
    carrying out calcination while superposing a flat plate on said substrate through the remaining spacers to adhere said spacers to said substrate and flat plate by fusion.

10. The method according to claim 9, wherein said spacers comprise glass beads.

11. The method according to claim 9, comprising the steps of:
    preparing said spacers having an oxide solder coating;
    preparing a slurry comprising said spacers and a liquid for forming a photopolymerizable photosensitive film;
    depositing said slurry on a surface of a substrate;
    drying said substrate to form a photopolymerizable photosensitive film thereon;
    then exposing the surface of said substrate having said photopolymerizable photosensitive film thereon to light to form an exposed pattern, said pattern comprising polymerized photosensitive film;
    calcining to adhere the spacers to the substrate and flat plate by fusion.

12. The method according to claim 11, further comprising a step of washing away the unexposed portion of the film.

13. The method according to claim 11, wherein said spacers are glass beads, and further comprising preparing said spacers by applying polymethyl methacrylate to a surface of each glass bead and then applying a glass frit including an oxide solder.

14. The method according to claim 11, wherein said spacers are glass beads.

15. The method according to claim 14, further comprising preparing said glass beads by applying a glass frit including an oxide solder.

* * * * *